United States Patent
Shin

(10) Patent No.: US 6,464,258 B2
(45) Date of Patent: Oct. 15, 2002

(54) DECOUPLER FOR EXHAUST PIPE OF AUTOMOBILES

(75) Inventor: Yeoun Ho Shin, Gyeonggi-do (KR)

(73) Assignee: DNV, Inc. (KR)

( * ) Notice: Subject to any disclaimer, the term of this patent is extended or adjusted under 35 U.S.C. 154(b) by 0 days.

(21) Appl. No.: 09/919,795

(22) Filed: Aug. 2, 2001

(65) Prior Publication Data

US 2002/0041095 A1 Apr. 11, 2002

(30) Foreign Application Priority Data

Oct. 11, 2000 (KR) .......................................... 00-28372

(51) Int. Cl.⁷ ................................................ F16L 11/12
(52) U.S. Cl. ........................ 285/49; 285/261; 285/226; 285/299; 285/300
(58) Field of Search ........................ 285/261, 49, 145.5, 285/226, 299, 300

(56) References Cited

U.S. PATENT DOCUMENTS

| | | | | |
|---|---|---|---|---|
| 4,508,373 A | * | 4/1985 | Ward ........................... | 285/226 |
| 4,659,117 A | | 4/1987 | Holzhausen et al. | |
| 4,893,847 A | * | 1/1990 | Hess ........................... | 285/226 |
| 4,911,482 A | | 3/1990 | Doat | |
| 5,318,329 A | * | 6/1994 | Suzuki et al. .................. | 285/49 |
| 5,437,479 A | | 8/1995 | Hartling et al. | |
| 5,611,577 A | * | 3/1997 | Meyer et al. ............... | 285/226 |
| 5,769,464 A | * | 6/1998 | DeBlasi et al. ............. | 285/226 |
| 5,775,737 A | * | 7/1998 | Morgner et al. ............... | 285/49 |
| 5,967,193 A | | 10/1999 | Nagai et al. | |
| 6,151,893 A | | 11/2000 | Watanabe et al. | |
| 6,164,703 A | | 12/2000 | Kim | |
| 6,296,282 B1 | * | 10/2001 | Burkhardt et al. .......... | 285/226 |

* cited by examiner

Primary Examiner—Lynne H. Browne
Assistant Examiner—Aaron Dunwoody
(74) Attorney, Agent, or Firm—Burns, Doane, Swecker & Mathis, L.L.P.

(57) ABSTRACT

A decoupler for exhaust pipe of automobiles includes a bellows for absorbing bending and expansion, the bellows being airtight with respect to exhaust gas therein, and an inner, cylindrical sleeve disposed in the bellows for protecting the bellows from the exhaust gas passing through the cylindrical sleeve. A guide member is disposed at one end of the bellows outside of and around at least a portion of the bellows, and a cover member is disposed at the other end of the bellows outside of and around at least a portion of the bellows. A first mesh ring and a second mesh ring are disposed between the guide member and the cover member and form a sliding surface in contact with a body portion of the cover member and circular-arc surfaces of the guide member. A first cushion mesh ring and a second cushion mesh ring are disposed between a first inclined section of the cover member and the first mesh ring and a second inclined of the cover member and the second mesh ring, respectively, the first cushion mesh ring and the second cushion mesh ring being made of a material that is adapted to be compressed and expanded.

2 Claims, 5 Drawing Sheets

PRIOR ART

DECOUPLER FOR EXHAUST PIPE OF AUTOMOBILES

BACKGROUND OF THE INVENTION

1. Field of the Invention

This invention relates to a decoupler for exhaust pipe of automobiles, and more particularly, to the decoupler for effectively absorbing the pitching vibration and rolling motion due to the vertical connection of the exhaust pipes, thereby improving durability of the exhaust system and passengers' comfort.

2. Description of the Prior Art

Generally, engines of the vehicle are connected to the exhaust pipe employing a muffler for exhausting the exhaust gas from the vehicle. For connection, a decoupler is installed to absorb and buffer the vibration displacement, impact load or heat deformation.

The decoupler on this location should absorb vibrations and displacement occurring depending on the movement of the exhaust system due to the engine and road vibrations. It may involve the excessive displacement occurring in any directions such as tension compression, bending, deflection and so on.

In order to maintain airtight of the exhaust gas and improve absorbing capability of the vibration displacement, the bellows is usually fabricated from metal.

A number of attempts have been made in the prior art to design an effective decoupler. One attempt to solve the problems of the prior art is demonstrated by Korean UM application 2000-2443 in which the decoupler functionally absorbs the displacement in the bending direction.

In the prior art (FIG. 5), an inner sleeve 20' in a cylindrical shape is fixed inward the bellows 10' which maintains the exhaust gas to be airtight and absorbs the expansion and bending displacement, so as to protect the bellows and guide the exhaust gas of high temperature to pass through.

A guide member 40' is located at the one end of the bellows 10' for having a circular-arc surfaces 41' and 42' with respect to the motion center C' of the bellows 10' to surround the bellows 10'.

At the other end of the bellows 10', a cover member 50' is located outward the guide member 40' for having an inclined section 51' at a predetermined angle with respect to the motion center C' in the frontward and a buffering protector 54' integrally bent in the rearward.

First and second mesh rings 60' and 61' are located between the respective ends of the cover member 50' and the circular-arc surfaces 41' and 42' of the guide member 40' respectively, wherein inner surfaces being in a contact with the circular-arc surfaces 41' and 42' and outer surfaces being fixed at the inclined section 51' and the buffering protector 54'.

In case that a displacement occurs in the bending direction during travelling of the vehicles, the circular-arc surfaces 41' and 42' of the guide member 40' is slid along the contact surface of the first and second mesh rings 60' and 61', thereby absorbing the impact displacement.

However, Korean UM application 2000-002443 is not configured to absorb tension or compression displacement and pitching vibration, but the impact due to the bending displacement.

FIG. 1 (Prior Art) shows that when the conventional decoupler is vertically mounted in the exhaust pipes, it cannot absorb the pitching vibration, thereby reducing the durability and vibration absorbing or noise reduction capabilities.

It has another disadvantage that the scope to be applied of the decoupler is very limited.

SUMMARY OF THE INVENTION

Accordingly, it is an object of the present invention to provide a decoupler with cushion mesh rings in which the pitching vibration from the engine is effectively absorbed even in a vertical connection to the exhaust pipes, to improve the durability of the exhaust system and passengers' comfort.

The another object of the present invention is to provide a decoupler for absorbing various vibration displacements from the engine, thereby increasing the scope to be applied.

According to an aspect of the present invention, a decoupler includes a bellows made of metal and formed in cylindrical and a repeatedly corrugated shapes for absorbing bending and expansion, the bellows being airtight with respect to exhaust gases therein. The decoupler further includes an inner, cylindrical sleeve disposed in the bellows for protecting the bellows from the exhaust gas passing through the cylindrical sleeve. A guide member is disposed at the one end of the bellows and includes a cylindrical portion having circular-arc surfaces at its opposite ends and is disposed outside of and around at least a portion of the bellows. A cover member is disposed at the other end of the bellows and includes a body portion having first and second inclined sections at its opposing ends, the inclined sections being inclined relative to the body portion, the cover member being disposed outside of and around at least a portion of the bellows. A first mesh ring and a second mesh ring are disposed between the guide member and the cover member and form a sliding surface in contact with the body portion of the cover member and the circular-arc surfaces of the guide member. A first cushion mesh ring and a second cushion mesh ring are disposed between the first inclined section of the cover member and the first mesh ring and the second inclined section of the cover member and the second mesh ring, respectively, the first cushion mesh ring and the second cushion mesh ring being made of a material that is adapted to be compressed and expanded.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
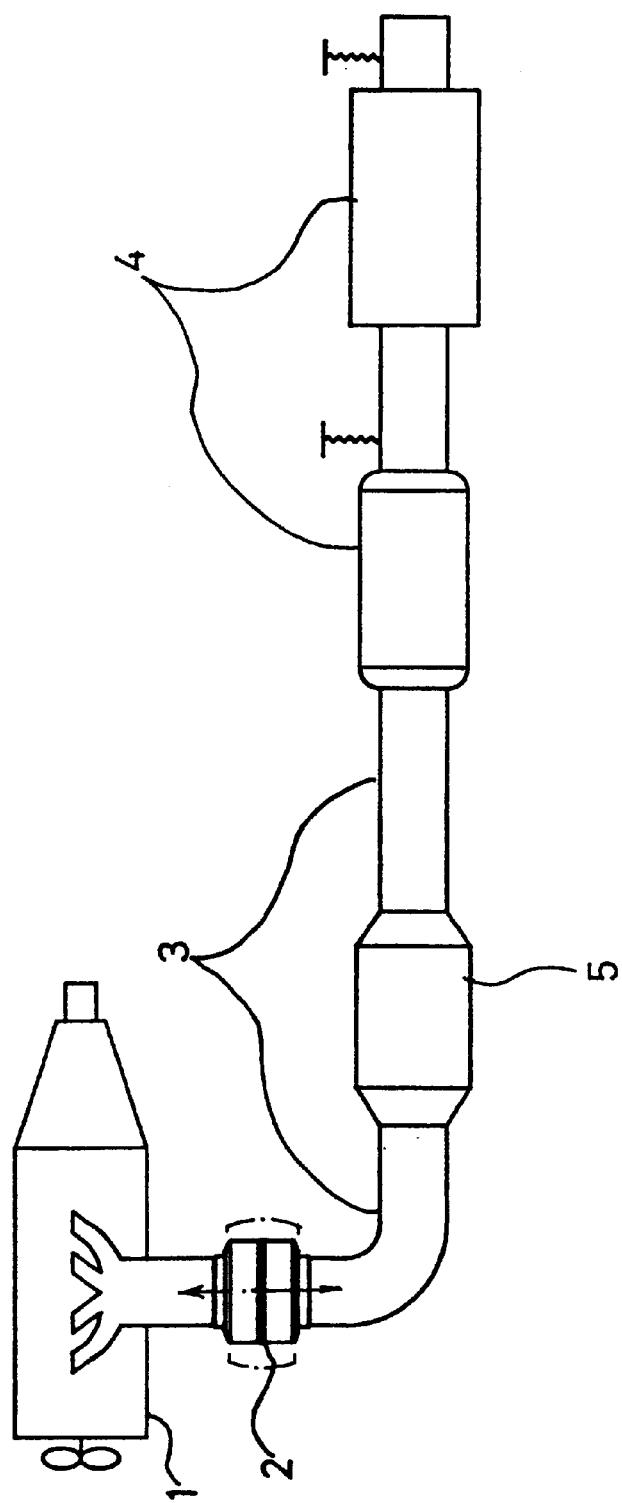
FIG. 1 is a schematic view of the decoupler according to the present invention.

Engines 1 are generally supported by a number of installations employing a muffler in the direction of the outlet of the exhaust pipe 3. The decoupler 2 connects the engines 1 and the exhaust pipe 3. FIG. 1 shows that the exhaust pipe 3 has a converter 5 and a muffler 4 at the end thereof.

Figure 2:
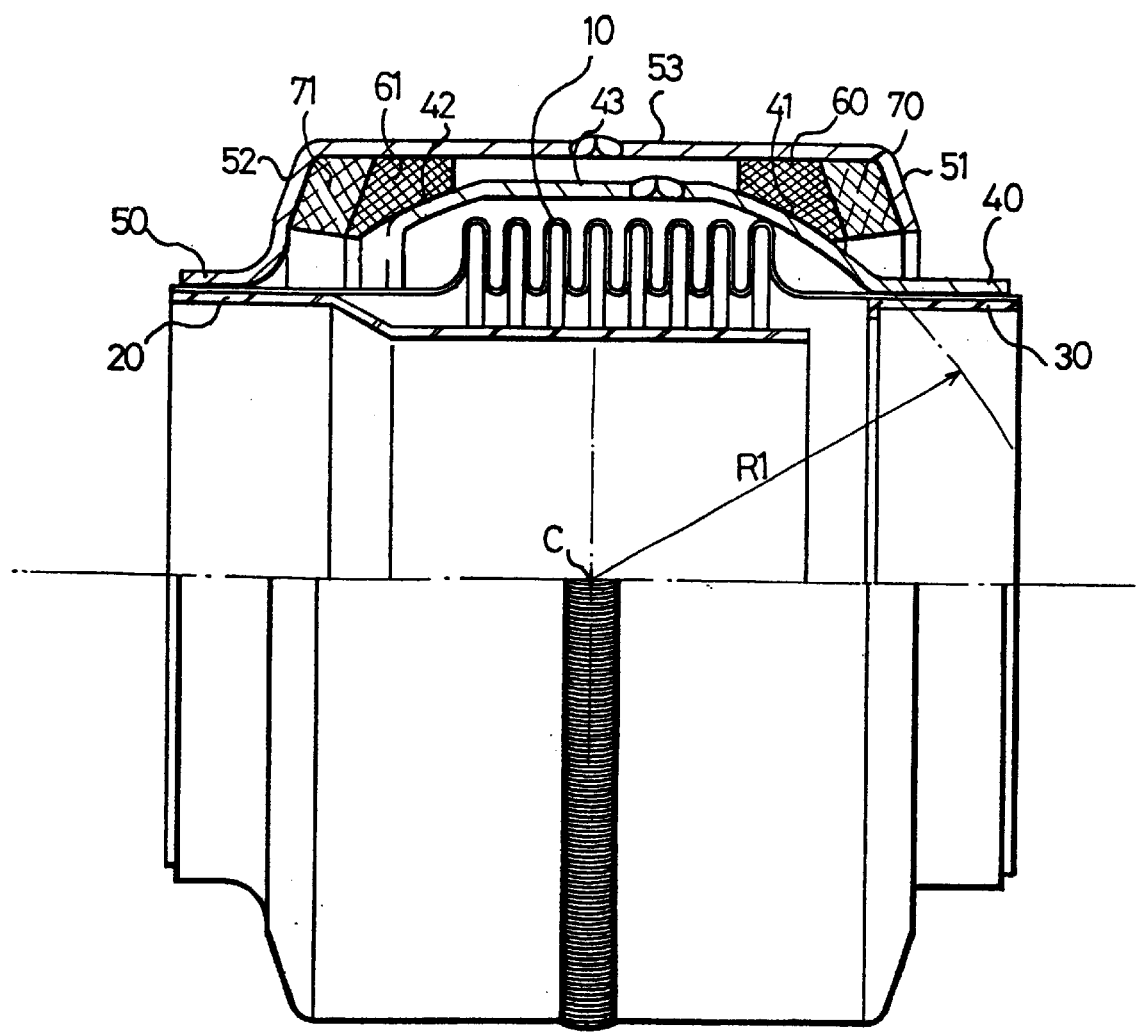
FIG. 2 is a sectional view of the decoupler according to the present invention.

As shown in FIG. 2, a bellows 10 of the decoupler of the automobile exhaust pipe functions to absorb the displacement in the direction of the expansion and bending, and prevents the exhaust gas through the inner sleeve 20 and the guide member 40.

The bellows 10 of a repeatedly corrugated shape can readily accommodate both axial displacement and bending displacement, and recovers the original shape when the external forces causing displacement are removed.

An inner sleeve 20 of a cylindrical shape is fixed inward the bellows 10 to protect the bellows 10 and allow the exhaust gas to pass through. At the rear end of the bellows 10, a rear sleeve 30 is installed.

The inner sleeve 20 (not shown) is symmetrically formed in the lateral direction of the bellows 10, to reduce the exhaust resistance and induce the exhaust flow smoothly.

Referring to FIG. 2, a guide member 40 located outward the bellows 10 is moved with the bellows 10 in the bending direction. The guide member 40 has a configuration in such that a cylindrical portion 43 is arranged in the middle of the guide member 40, and circular-arc surfaces 41 and 42 are arranged on the radius R1 with respect to the motion center C of the bellows 10.

The circular-arc surfaces 41 and 42 having a predetermined radius R1 with regard to the motion center C of the bellows 10 slide with the first and second mesh rings 60 and 61 to be mentioned later to absorb the bending impact.

The bending center is set to a motion center C of the bellows 10 to induce an angular motion from the bellows 10 to lower the stress, to maintain the endurance, with the small number of convolutions in the bellows 10.

Outwardly disposed from the guide member 40, a cover member 50 is disposed to wrap the bellows 10, for preventing corrosion from gas or alien substance. The guide member 40 has a cylindrical body portion 53 in the middle thereof, inclined sections 51 and 52 symmetrically formed at the opposing ends of the body portion 53, with respect to the motion center C of the bellows 10 at a predetermined angle.

Each of first mesh ring 60 and second mesh ring 61 is disposed between the cylindrical body portion 53 and the circular-arc surfaces 41 and 42 of the guide member 40. The first and second mesh ring 60 and 61 have the same contact with the body portion 53 and are inclined at the same angle with the circular-arc surfaces 41 and 42 of the guide member 40.

First cushion mesh ring 70 and second cushion mesh ring 71 are disposed between the cover member 50 and the first and second mesh ring 61 and 61, made of compressive and expansive material to absorb the axial vibration.

In case that the pitching vibration and rolling displacement are applied in this condition, the circular-arc surfaces 41 and 42 of the guide member 40 slides along the inner side of the first and second mesh rings 60 and 61 to absorb the bending displacement.

The expansion and compression of the first and second cushion mesh rings 70 and 71 function to absorb the tension and compression displacement from the pitching vibration.

Figure 3:
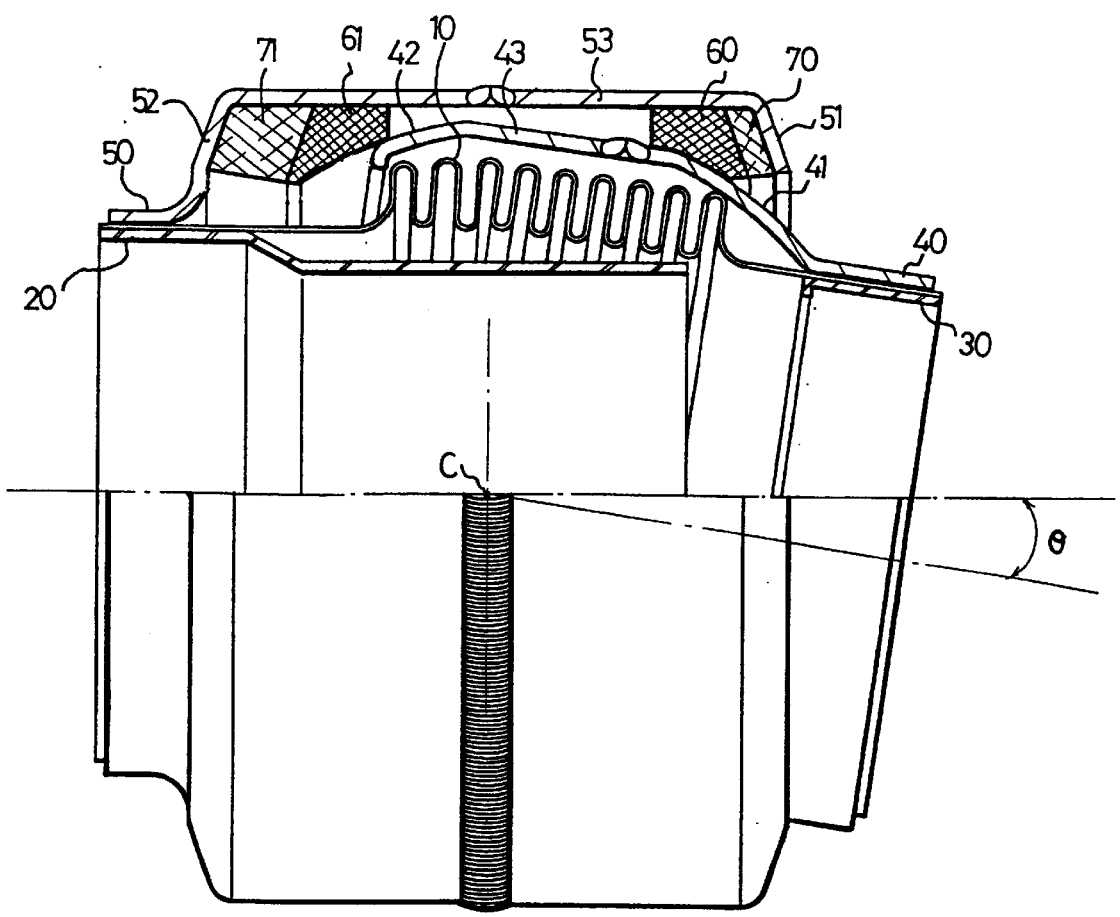
FIG. 3 is a conceptual view in which the decoupler absorbs the displacements in simultaneously occurrence of the tension and bending displacement.

Referring to FIG. 3, in case that the axial tension displacement and bending displacement simultaneously occur, the second cushion mesh ring 71 elastically becomes longer, while the first cushion mesh ring 70 becomes shorter as much to absorb tension displacement from pitching vibration, in this condition, the circular-arc surfaces 41 and 42 of the guide member 40 slides along the inner side of the first and second mesh rings 60 and 61 to absorb the bending displacement at the bending angle Ø.

Figure 4:
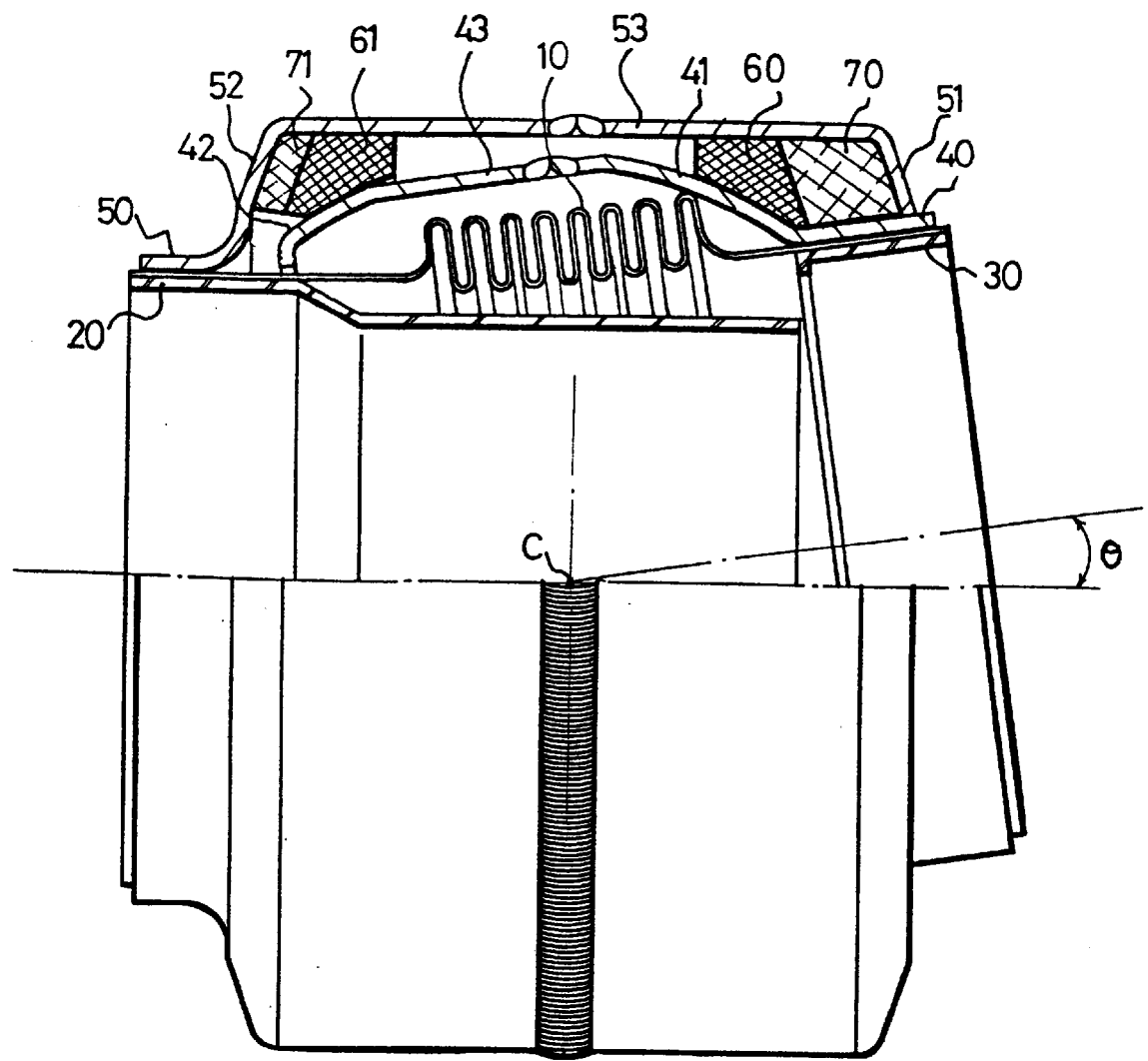
FIG. 4 is a conceptual view in which the decoupler absorbs the displacements in simultaneously occurrence of the compression and bending displacement.
Figure 5:
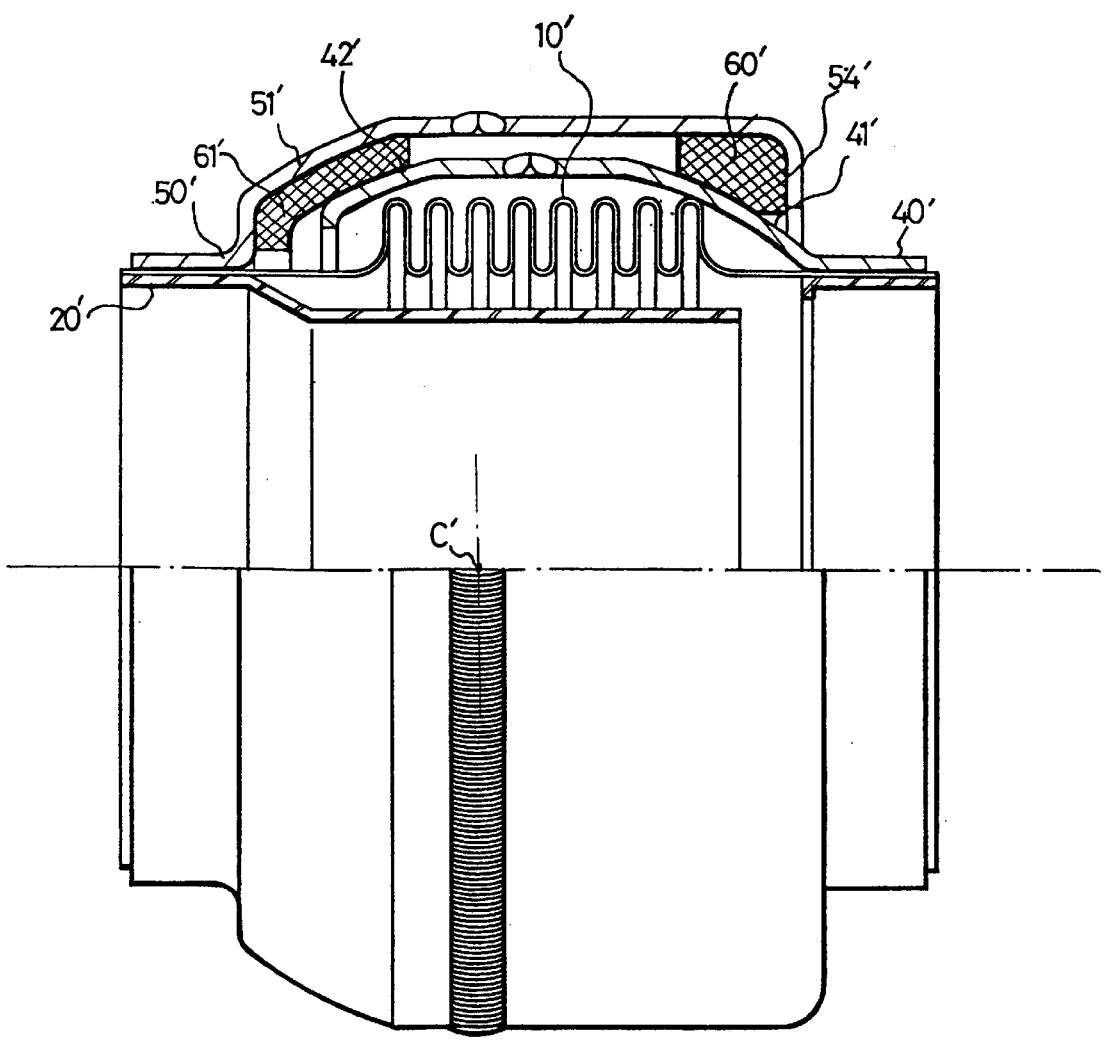
FIG. 5 is a partially sectional view a conventional decoupler for an exhaust pipe.

Referring to FIG. 4, in case that the axial compression displacement and bending displacement simultaneously occur, the second cushion mesh ring 71 elastically becomes shorter, while the first cushion mesh ring 70 becomes longer as much to absorb the compression displacement from pitching vibration, in this condition, the circular-arc surfaces 41 and 42 of the guide member 40 slides along the inner side of the first and second mesh rings 60 and 61 to absorb the bending displacement at the ending angle Ø.

Accordingly, the present invention simultaneously absorbs the pitching vibration and rolling motion occurring from the engines of the vertical exhaust system, thereby improving the durability of the exhaust system (FIG. 1).

Since the center point of the bending displacement is the motion center C of the bellows 10, the bending displacement allows the stress to uniformly apply to the bellows 10, thereby prolonging the life of the bellows 10.

The first and second mesh rings 60 and 61 are made of elastic material in order to absorb the impact due to the engine or road vibration and expansion and bending displacement, preferably, the material made of compressed thin wiring net in a ring shape to have perpetual resilience and easy molding.

Due to the repetitive friction applied to the first and second mesh rings 60 and 61, it is preferable to apply appropriate surface treatment material such as the carbon or insulation coating on the surface. By this configuration, the present invention contributes the smooth sliding movement the reduction of the wear and friction noise, so that it guarantees product reliability.

The first and second cushion mesh rings 70 and 71 should have the characteristics of resilience and softness, and is preferably made of resilient material which has such low density as to expand and compress within the range of −1 mm~1 mm.

In the decoupler for the exhaust pipe of automobiles, the cover member 50 and the first and second cushion mesh rings 70 and 71 absorb the axial displacement, such as tension, compression and so on by the expansion and compression thereof.

In the present invention, the guide member 40 slides along the inner side of the first and second mesh rings 60 and 61 to absorb the bending displacement. The present invention also absorbs displacements due to the pitching vibration and rolling motion.

Accordingly, the present invention has an effect to improve the durability of the exhaust system and passengers' comfort and prolong the life of the exhaust system. The present invention contributes the reduction of the wear and friction noise, so that it guarantees the product reliability and the prolonged life of the exhaust pipe.

The present invention is not limited to these embodiments, and it should be clear to those skilled in the art that other embodiments are possible within the spirit and scope of the invention claimed.

What is claimed is:

1. A decoupler for exhaust pipe of automobiles, comprising
    a bellows made of metal and formed in cylindrical and repeatedly corrugated shapes for absorbing bending and expansion, the bellows being airtight with respect to exhaust gas therein;

an inner, cylindrical sleeve disposed in the bellows for protecting the bellows from the exhaust gas passing through the cylindrical sleeve;

a guide member disposed at one end of the bellows and including a cylindrical portion having circular-arc surfaces at its opposite ends, the guide member being disposed outside of and around at least a portion of the bellows;

a cover member disposed at the other end of the bellows and including a body portion having first and second inclined sections at its opposing ends, the inclined sections being inclined relative to the body portion, the cover member being disposed outside of and around at least a portion of the bellows;

a first mesh ring and a second mesh ring disposed between the guide member and the cover member and forming a sliding surface in contact with the body portion of the cover member and the circular-arc surfaces of the guide member; and first cushion mesh ring and a second cushion mesh ring disposed between the first inclined section of the cover member and the first mesh ring and the second inclined of the cover member and the second mesh ring, respectively, the first cushion mesh ring and the second cushion mesh ring being made of a material that is adapted to be compressed and expanded.

2. A decoupler for exhaust pipe of automobiles as claimed in claim 1, wherein the first and second cushion mesh rings are sufficiently resilient to compress and expand within a range of −1 mm to +1 mm.

* * * * *